(12) United States Patent
Wang

(10) Patent No.: US 6,553,695 B1
(45) Date of Patent: Apr. 29, 2003

(54) LICENSE PLATE FRAME

(76) Inventor: Calvin S. Wang, 14317 E. Don Julian Rd., Industry, CA (US) 91746

( * ) Notice: Subject to any disclaimer, the term of this patent is extended or adjusted under 35 U.S.C. 154(b) by 0 days.

(21) Appl. No.: 09/629,906

(22) Filed: Jul. 31, 2000

(51) Int. Cl.[7] .................................................. G09F 7/00
(52) U.S. Cl. ............................ 40/209; 40/210; 40/798
(58) Field of Search ........................... 40/209, 210, 798, 40/799, 630, 638, 594

(56) References Cited

U.S. PATENT DOCUMENTS

| 4,190,691 A | * | 2/1980 | Kramer ....................... 428/67 |
| D257,341 S | * | 10/1980 | Blaser ....................... D12/193 |
| 4,858,358 A | * | 8/1989 | Gagnon ....................... 40/616 |
| D333,119 S | * | 2/1993 | Russell ....................... D12/193 |
| 5,268,228 A | * | 12/1993 | Orr ............................ 428/343 |
| D428,374 S | * | 7/2000 | Steinhagen ................ D12/193 |

FOREIGN PATENT DOCUMENTS

JP          08-117074      *   5/1996   ............ A47G/1/06

* cited by examiner

*Primary Examiner*—Cassandra H. Davis
(74) *Attorney, Agent, or Firm*—Albert O. Cota

(57) ABSTRACT

A license plate frame (10) that includes a first horizontal section (14) having a pair of mounting tabs (22) and a second horizontal section (16) having a pair of indicia emblems (44). The design of the frame (10) allows the frame to be attached to a vehicle license plate (80) in either of two selectable positions: in the first position the frame (10) is attached to the vehicle with the pair of emblems (44) located on the lower section of the frame; in the second position the frame (10) is attached to a vehicle with the pair of emblems located on the upper section of the frame.

1 Claim, 3 Drawing Sheets

LICENSE PLATE FRAME

TECHNICAL FIELD

The invention pertains to the general field of license plate frames and more particularly to a license plate frame that can be attached with indicia displayed on a lower section of the frame or turned upside down and be attached with the indicia displayed on an upper section of the frame.

BACKGROUND ART

In the United States, as well as many other countries, all operational vehicles are required to display license plates. License plates are utilized to identify ownership, display registration fee payment and to allow law enforcement a means of determining a characteristics of the legal status of individual vehicles and owners.

A typical U.S. license plate is a rectangular metal plate with a group of letters, numbers or a combination thereof. Originally, license plates were assigned in the order of manufacture, but many states have decided to allow individuals to order custom plates with personally selected numbers or letters. Unfortunately, the custom license plates cost more than standard plates. For those individuals who do not desire a custom plate, a viable alternative has long being to surround the plate with a frame. License plate frames come in a wide variety of designs, from the under-stated simple, metal or plastic, non-ornamented frame, to garnished design that incorporate lights or other modification to enhance the visual appeal.

Typically, license plate frames, which include indicia, are designed to be attached to a license and vehicle bracket in a single position. The design of the instant invention allows the license plate frame to be attached in either of two positions. In either position the indicia is in a correct orientation to be viewed.

A search of the prior art did not disclose any patents that read directly on the claims of the instant invention however, the following U.S. Pat. Nos. were considered related:

| PATENT NO. | INVENTOR | ISSUED |
| --- | --- | --- |
| Des. 398, 271 | Wang | Sept. 15, 1998 |
| Des. 397, 074 | Wang | Aug. 18, 1998 |
| Des. 361, 971 | Wang | Sept. 5, 1995 |

DISCLOSURE OF THE INVENTION

The license plate frame in its basic design has a first horizontal section which includes a pair of mounting tabs, a second horizontal section, a left vertical section, a right vertical section, and a pair of emblems. One emblem is attached at the intersection of the left vertical section and the second horizontal section, and the second emblem is attached at the intersection of the right vertical section and the second horizontal section. The license plate frame can be positioned and attached to a vehicle mounting bracket with the mounting tabs located above the second horizontal section; or the frame can be turned upside down and attached with the mounting tabs located below the second horizontal section.

The ability to mount the frame in two configurations gives a person the choice of displaying the indicia emblem above the license plate or below it. Additionally, by providing a multiplicity of emblems, different words or images may be chosen for display. When the emblems are attached by a non-permanent adhesive, they may be removed and changed repeatably depending on the need or design at a particular time.

Therefore, the primary object of the invention is to provide a license plate frame that includes either permanently-attached or removably indicia which can be mounted to a license plate and vehicle with either the indicia above or below the license plate.

Additionally, it is the object of the invention to provide a license plate frame that is:

easy to customize per a person's need or desire, is convenient and easy to assembly and attached to a vehicle, able to be manufactured in a variety of materials, such as metal, wood or plastic, can be made in a variety of colors or can be plated with metals such as silver, gold or chrome, can be sold in a variety of different markets, is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
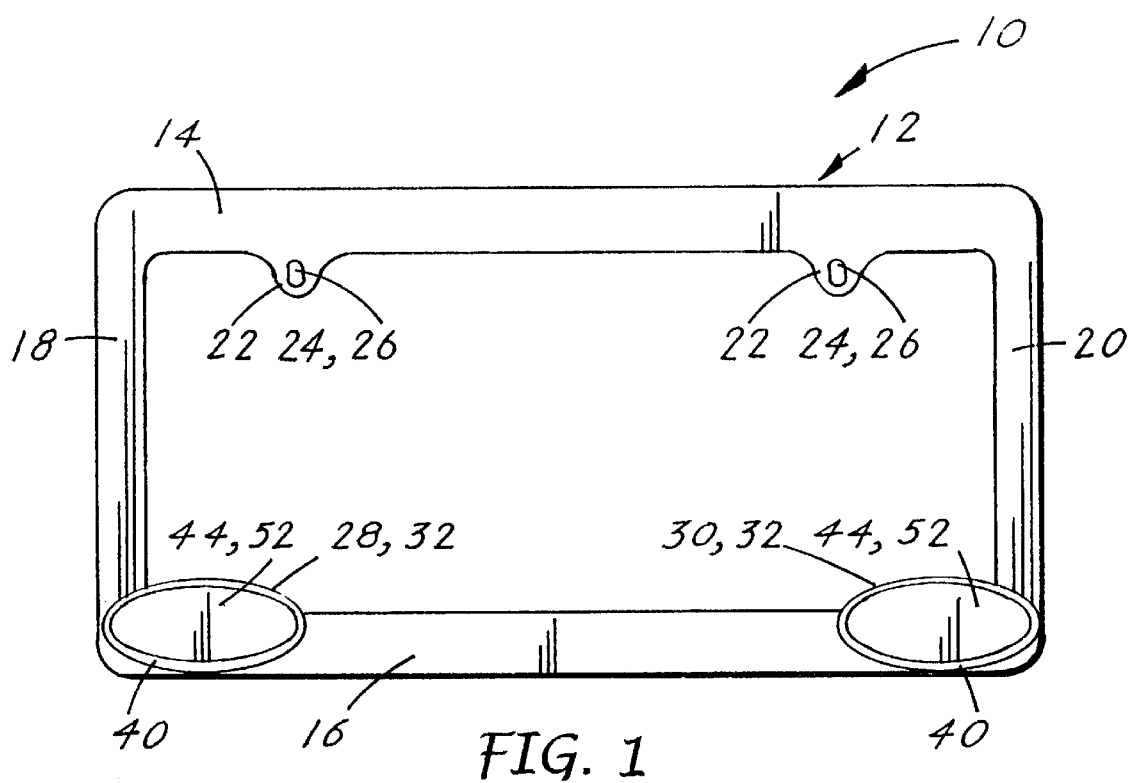
FIG. 1 is a front elevational view of a license plate frame configured with an upper first horizontal section having mounting tabs and a lower second horizontal section which includes an elliptical composite indicia emblem on each lower corner.

The best mode for carrying out the invention is presented in terms of a preferred embodiment for a license plate frame that includes a horizontal section on which is located an indicia emblem i.e., a logo. When the frame is attached to a vehicle in a first Position, the logo is located on the lower section of the frame; when the frame is turned upside down and attached to the vehicle, the logo is located on the upper section of the frame. The preferred embodiment of the license plate frame 10, as shown in FIGS. 1–7, is comprised of two major elements: an integral frame 12 and at least one composite indicia emblem 44.

The integral frame 12, as shown in FIGS. 1, 2, 6 and 7, is comprised of first horizontal section 14, a second horizontal section 16, a left vertical section 18 and a right vertical section 20. The first horizontal section 14, includes a pair of mounting tabs 22 that project inward. Each tab 22 has a frame mounting bore 24. As shown best in FIGS. 1 and 2, the tabs 22 are vertically elongated 26 to allow the license plate frame 10 to be vertically aligned.

The frame can be constructed of metal that is subsequently plated or a plastic such as a high-impact plastic can be used.

Figure 2:
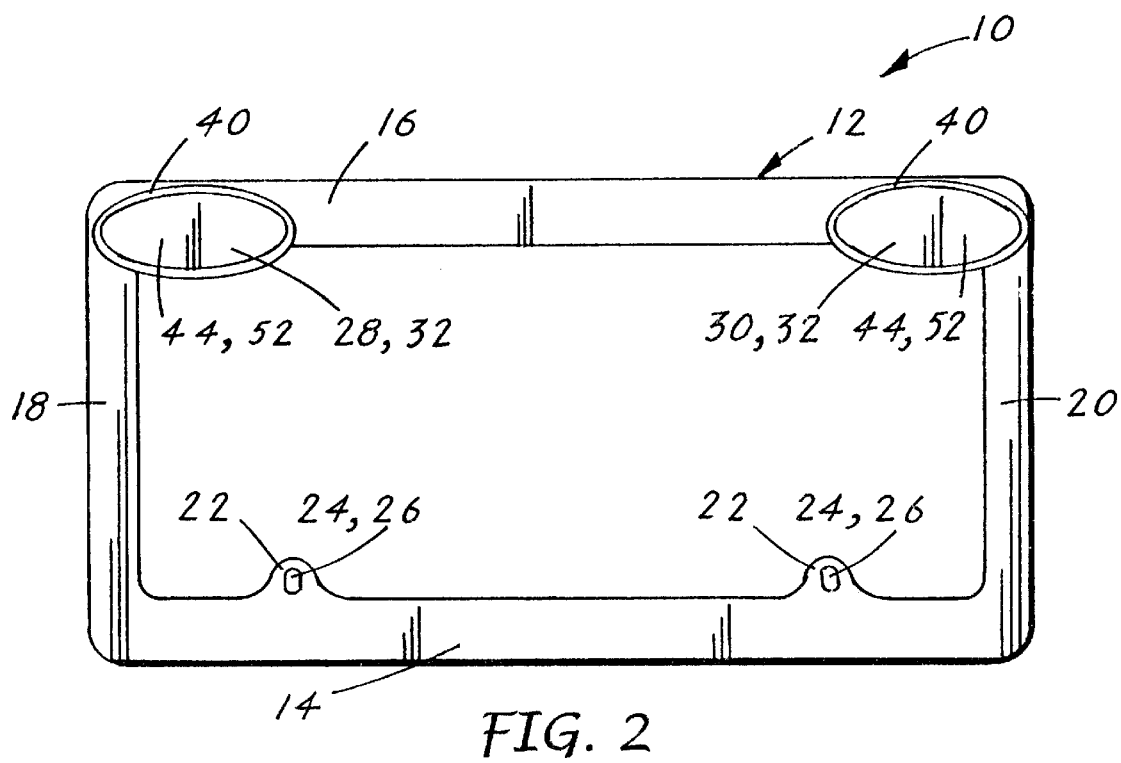
FIG. 2 is a front elevational view of a license plate frame configured with a lower first horizontal section having mounting tabs and a lower second horizontal section which includes an elliptical composite indicia emblem on each upper corner.
Figure 3:
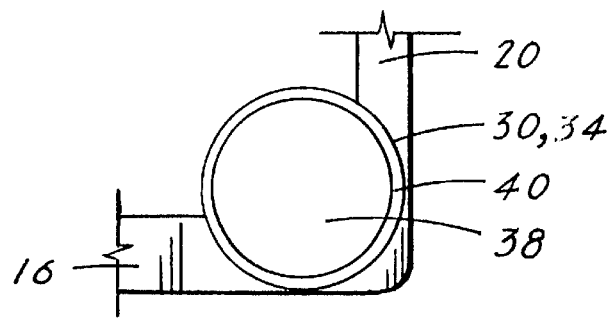
FIG. 3 is a partial front elevational view of a license plate frame having a circular composite indicia emblem.
Figure 4:
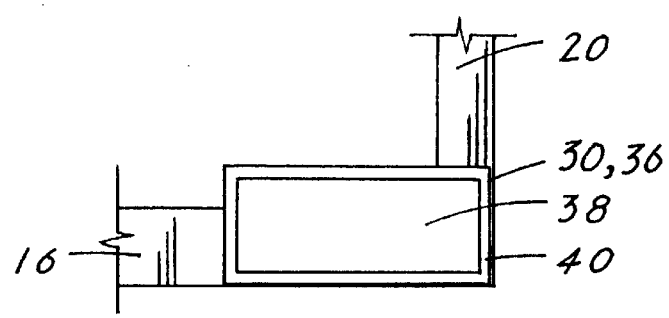
FIG. 4 is a partial front elevational view of a license plate frame having a rectangular composite indicia emblem.

At the intersection of the left vertical section 18 and the second horizontal section 16, is located an integral first emblem retainer 28; and located adjacent the intersection of the right vertical section 20 and the second horizontal section 16 is likewise located a second emblem retainer 30. The first and second retainers have a flat area 38 that is bordered by an outward extending protuberance 40. The first and second emblem retainers can be designed to have an elliptical shape 32 as shown in FIGS. 1 and 2, a circular shape 34 as shown in FIG. 3 or a rectangular shape 36 as shown in FIG. 4.

The invention features a composite indicia emblem 44 that is attached to the first and second emblem retainers 28, 30. The emblem 44 as shown is the exploded view of FIG. 5 has:

1. An outer rigid section made of plastic and having an outer surface 48 and an inner surface 50. On the outer surface is applied the indicia as shown in FIGS. 1, 2, 6 and 7. The indicia can be directly printed or a vacuum deposit method 54 can be used in which case a clear plastic sheet 50 can be placed over the indicia 52 to protect the indicia from the elements;
2. A resilient section 58 having an outer surface 60 and an inner surface 62. The resilient section, 58 is preferably made of a closed-cell sponge such as neoprene.
3. An adhesive 64 that is applied to both the outer surface 60 and inner surface 62 of the resilient section 58. The outer surface of the resilient section 58 is attached to the inner surface 50 of the outer rigid section 46. The adhesive 64 can consist of a pressure sensitive adhesive 66 or a two-sided adhesive tape 68; and
4. A peel-off backing 70 having an outer surface 74, an inner surface 76 and a pull tab 78 on one edge. The backing 70 is preferably comprised of a plastic peel sheet 72. The outer surface 74 is removably attached to the adhesive 64 on the inner surface 62 of the resilient section 58.

The composite indicia emblem 44 is dimensioned to be inserted into and attached to the first emblem retainer 28 and to the second emblem retainer 30 when the pull-tab on the peel-off backing 70 is pulled off to remove the backing and expose the inner surface 50 of the resilient section 58.

Figure 6:
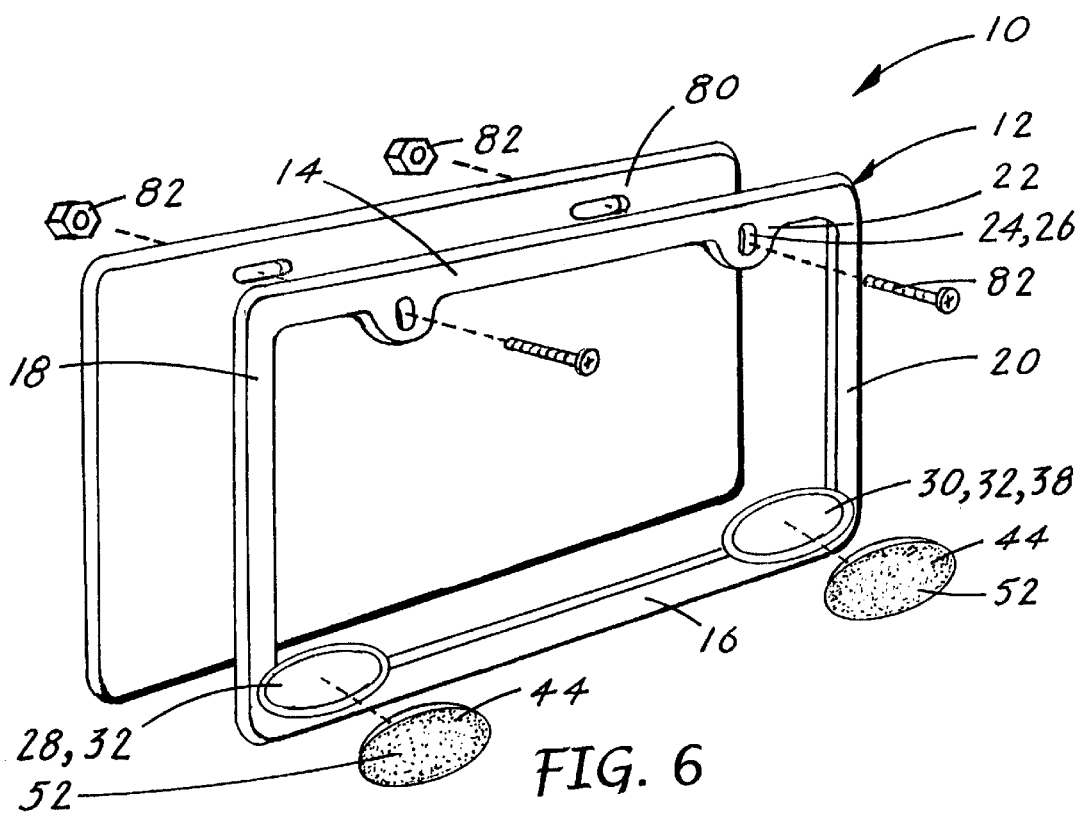
FIG. 6 is a perspective view of a license plate frame in the process of being attached with fasteners to a license plate, wherein the frame is positioned to allow a pair of composite indicia emblems to be attached to each lower corner of the frame.
Figure 7:
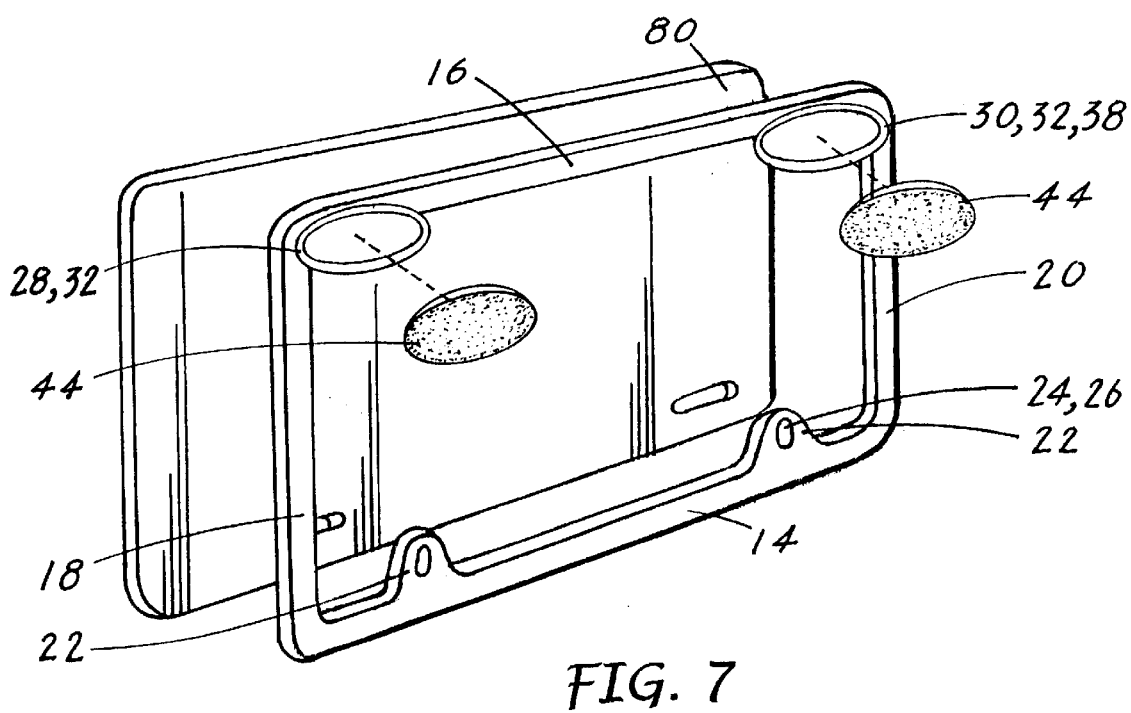
FIG. 7 is a perspective view of a license plate frame in the process of being attached with fasteners to a license plate, wherein the frame is positioned to allow a pair of composite indicia emblems to be attached to each upper corner of the frame.

The license plate frame 10 is designed to be attached in either a first position, as shown in FIG. 6, or in a second position as shown in FIG. 7. In the first position, the first horizontal section 14 with the mounting tabs 22 is located above the second horizontal section 16 which includes the first and second emblem retainers 28,30. To each retainer 28,30 is attached a composite indicia emblem 44. In the second position, the first horizontal section 14 with the mounting tabs 22 is located below the second horizontal section 16 with the first and second emblem retainer 28,30. To each retainer 28,30 is attached a composite 2 indicia emblem 44.

As shown in FIG. 6, the license plate frame 10 can be easily attached to the license plate 80 and to a vehicle mounting bracket by means of a combination bolt/nut combination.

Figure 5:
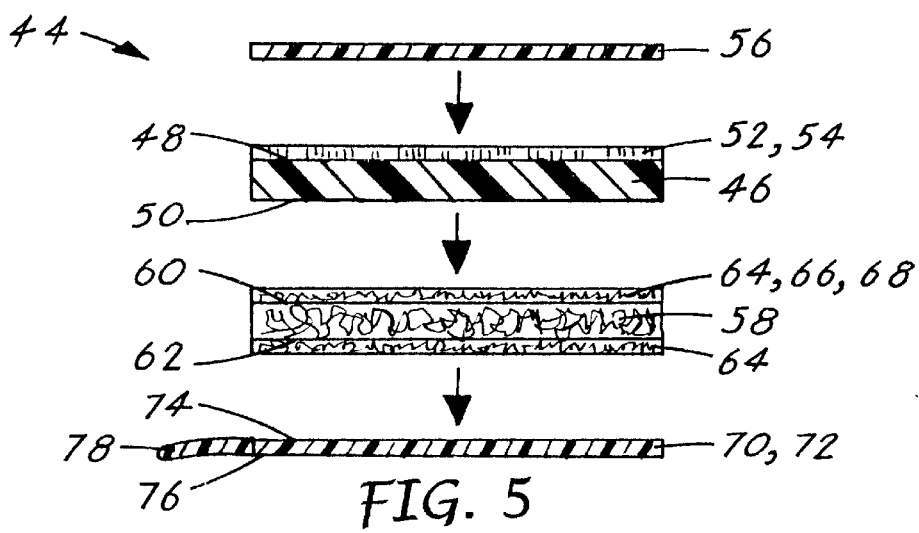
FIG. 5 is an exploded sectional side view of a composite indicia emblem.

When the license plate frame 10 is purchased a small piece of two-sided adhesive tape 68 is attached substantially to the center of the flat area 38 on the first and second emblem retainers 28,30. The tape 68 allows the composite indicia emblem to be temporarily attached to the retainers 28,30 prior to deciding in what position the license plate frame 10 is to be attached to the license 80. After a decision is reached, the pull-tab 78 on the peel-off backing 70, as shown in FIG. 5, is pulled to remove the backing and allow the composite indicia emblem 44 to be permanently affixed to the retainers 28,30.

While the invention has been described in complete. detail and pictorially shown in the accompanying drawings it is not to be limited to such details, since many changes and modifications may be made to the invention without departing,,from the spirit and the scope thereof. Hence, it is described to cover any and all modifications and forms which may come within the language and scope of the claims.

What is claimed is:

1. A license plate frame comprising:

a) an integral frame having a first horizontal section, a second horizontal section, a left vertical section and a right vertical section, b) a pair of mounting tabs projecting inward from the first horizontal section, wherein each tab having a frame mounting bore, c) an integral first emblem retainer located adjacent to an intersection consisting of the left vertical section and the second horizontal section, and an integral second emblem retainer located adjacent the intersection of the right vertical section and the second horizontal section, wherein said first and second retainers have a flat area bordered by an outward extending protuberance, d) a composite indicia emblem comprising:
   (1) an outer rigid section having an outer surface and an inner surface, wherein the outer surface has indicia,
   (2) a resilient section having an outer surface and an inner surface,
   (3) an adhesive applied to both the outer surface and inner surface of said resilient section, wherein the outer surface of said resilient section is attached to the inner surface of said outer rigid section,
   (4) a peel-off backing having an outer surface, an inner surface and a pull tab on one edge, wherein the outer surface of the peel-off backing is removably attached to the inner surface of said resilient section, wherein the composite indicia emblem is dimensioned to be inserted into and attached to the first and second said emblem retainers when said pull-tab on said peel-off backing is pulled off to remove said backing to expose the inner surface of said resilient section, wherein said license plate frame is designed to be attached in either a first or second position: in the first position, the first horizontal section with the mounting tabs is located above the second horizontal section with the first and second emblem retainers to each of which is attached the composite indicia emblem; in the second position, the first horizontal section with the mounting tabs is located below the second horizontal section with the first and second emblem retainer to each of which is attached the composite indicia emblem, wherein in either position, the composite indicia emblem is attached in a correct viewing position, and 2) a piece of two-sided adhesive tape attached substantially to the center of the flat area of said first and second emblem retainers, wherein said tape allows said composite indicia emblem to be temporarily attached prior to deciding what position the license plate frame is to be attached to a license.

* * * * *